March 24, 1931.  H. T. THOMAS  1,797,595
WINDSHIELD VENTILATOR ADJUSTMENT MECHANISM
Filed Jan. 18, 1926
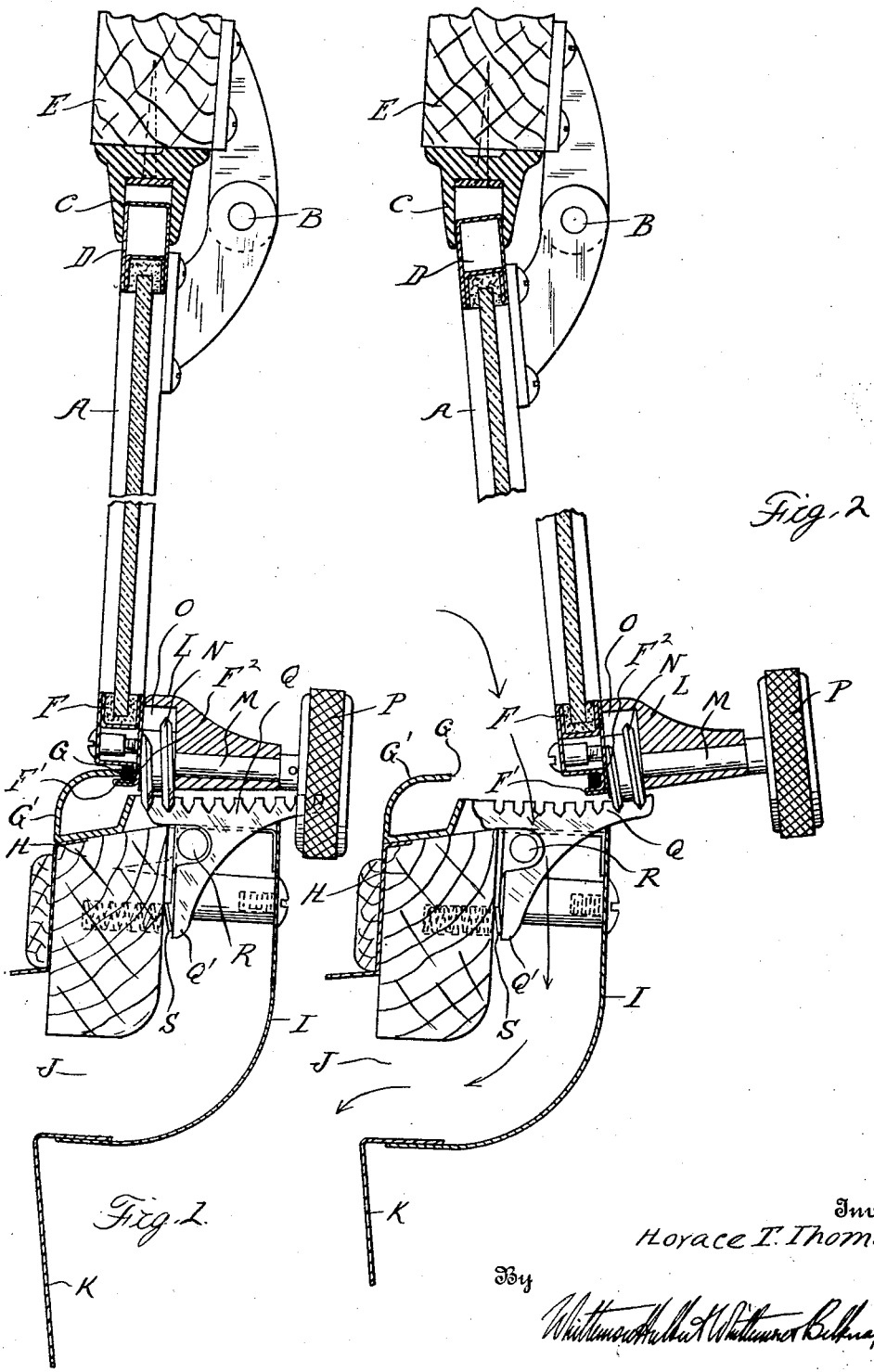
Inventor
Horace T. Thomas
By
Attorneys Patented Mar. 24, 1931

1,797,595

UNITED STATES PATENT OFFICE

HORACE T. THOMAS, OF LANSING, MICHIGAN, ASSIGNOR TO REO MOTOR CAR COMPANY, OF LANSING, MICHIGAN, A CORPORATION OF MICHIGAN

WINDSHIELD-VENTILATOR ADJUSTMENT MECHANISM

Application filed January 18, 1926. Serial No. 82,098.

The invention relates to windshields for motor vehicles and of that type in which the shield may be shifted from its closed position to a position where it acts as a deflector for directing a current of air downward beneath the cowl. The present invention relates more particularly to the mechanism for adjusting the windshield and to this end consists in the novel construction hereinafter set forth.

In the drawings;

Figure 1 is a vertical section through a windshield to which my improvements are applied.

Figure 2 is a similar view showing the shield adjusted to the position for ventilation.

As illustrated, the windshield A is hinged at B adjacent to its upper end so as to be capable of swinging inward. The upper edge of the shield is weather proofed by a channel strip C preferably formed of rubber and embracing the upper rail D of the shield, said strip being secured to the stationary frame E. The lower rail F of the shield is provided with a channel F' on its forward edge containing a gasket F² for seating against a rearwardly inturned flange G of the channel member G' mounted on the frame or cowl bar H. Thus when the sash is pressed against the flange G a weather-proof joint will be formed.

To permit of ventilation through the cowl there is arranged adjacent to the cowl bar H a deflector member I, which at its lower end is curved forwardly and communicates with an aperture J in the instrument board K. This deflector extends across the full width of the shield and therefore when the shield is swung rearwardly the air impinging thereagainst will be deflected downward through the aperture J and beneath the instrument board into the car.

For effecting this adjustment I have provided an adjusting means which permits of any desired angular movement of the shield and which locks the shield in each position of adjustment, the construction being as follows:

L is a bracket member bolted or otherwise secured to the lower rail F of the windshield and providing a bearing for a rotary shaft M. This shaft has mounted thereon at one end, the worm N which is located in a recess O in the member L, said recess being open at its bottom and the threads of the worm projecting downward out of the recess. P is a knob mounted on the opposite end of the shaft M and by means of which said shaft and worm can be rotated in either direction. Q is a rack member pivotally attached at R to the cowl bar H, the rack being curved in an arc concentric with the axis of the hinge B. The member Q is also provided with a downwardly projecting arm Q' which bears against a spring S located in a recess in the cowl bar.

With the construction as described, the rotation of the knob P will be communicated to the worm O which, through its engagement with the rack Q will be moved outward bearing the windshield A with it. The pitch of the worm is well within the angle of friction so that in each position of adjustment it will act as a positive lock for the windshield holding the same from displacement in either direction. Thus, any desired degree of ventilation may be produced by adjustment of the shield.

The rack Q being pivotally mounted on the frame and being also under the tension of the spring S, will always be held in firm engagement with the worm, so as to prevent rattling.

What I claim as my invention is:

The combination with a movable windshield and a frame for the same, of a worm member rotatably carried by the said windshield, a rack engageable with the said worm, the said rack being movably mounted on the said frame, an arm on the said rack, and resilient means arranged between the said arm and the frame for yieldably urging the rack into firm engagement with the said worm.

In testimony whereof I affix my signature.

HORACE T. THOMAS.